United States Patent [19]

Davis

[11] Patent Number: 4,485,201

[45] Date of Patent: Nov. 27, 1984

[54] METHOD OF MODIFYING ASPHALT WITH THERMOPLASTIC POLYMERS, GROUND RUBBER AND COMPOSITION PRODUCED

[75] Inventor: Fred R. Davis, Kent, Ohio

[73] Assignee: Midwest Elastomers, Inc., Wapakoneta, Ohio

[21] Appl. No.: 553,821

[22] Filed: Nov. 21, 1983

[51] Int. Cl.³ .......................... C08L 7/00; C08L 9/00; C08L 53/04; C08L 95/00
[52] U.S. Cl. ........................................ 524/68; 524/506
[58] Field of Search .................. 524/68, 505; 525/54.5

[56] References Cited

U.S. PATENT DOCUMENTS

| | | | |
|---|---|---|---|
| 3,345,316 | 10/1967 | Nielsen | 260/28.5 |
| 3,440,195 | 4/1969 | Norcross | 260/28.5 |
| 3,523,493 | 8/1970 | Berry | 94/18 |
| 3,557,250 | 5/1971 | Rostler | 106/278 |
| 3,565,842 | 2/1971 | Pitchford | 260/28.5 |
| 3,611,888 | 10/1971 | Kavalir | 260/28.5 |
| 3,755,231 | 8/1973 | Muir et al. | 260/28.5 |
| 3,825,513 | 7/1974 | Rostler | 260/28.5 |
| 3,856,732 | 12/1974 | Bresson et al. | 260/28.5 |
| 3,900,692 | 8/1975 | Rostler | 428/489 |
| 3,978,014 | 8/1976 | VanBoem et al. | 260/28.5 |
| 4,021,393 | 5/1977 | McDonald | 260/28.5 |
| 4,032,491 | 6/1977 | Schoenke | 260/28.5 |
| 4,068,023 | 1/1978 | Nielsen et al. | 427/138 |
| 4,069,182 | 1/1978 | McDonald | 260/28.5 |
| 4,115,335 | 9/1978 | Reusser et al. | 524/68 |
| 4,130,516 | 12/1978 | Gagle et al. | 260/28.5 |
| 4,145,322 | 3/1979 | Maldonado et al. | 260/28.5 |
| 4,172,061 | 10/1979 | Bresson | 260/28.5 |
| 4,196,115 | 4/1980 | Bresson | 524/68 |
| 4,217,259 | 8/1980 | Bresson | 260/28.5 |
| 4,250,067 | 2/1981 | Bresson | 260/28.5 |
| 4,264,481 | 4/1981 | Markvik | 260/2.3 |
| 4,282,127 | 8/1981 | Desgouilles | 260/28.5 |
| 4,330,449 | 5/1982 | Maldonado et al. | 524/68 |
| 4,332,703 | 6/1982 | Lijzenga et al. | 260/23.7 |
| 4,381,357 | 4/1983 | von der Wetter et al. | 524/68 |
| 4,426,419 | 1/1984 | Uffner et al. | 524/68 |

FOREIGN PATENT DOCUMENTS

| | | | |
|---|---|---|---|
| 859226 | 12/1970 | Canada | 524/68 |
| 51-20219 | 2/1976 | Japan | 524/68 |
| 1201135 | 8/1970 | United Kingdom . | |
| 2038848 | 7/1980 | United Kingdom . | |

*Primary Examiner*—Allan M. Lieberman
*Attorney, Agent, or Firm*—Oldham, Oldham, Hudak & Weber Co.

[57] ABSTRACT

A thermoplastic elastomer asphalt composition is a blend of 100 parts by weight of asphalt, from about 12 to about 20 parts by weight of ground rubber containing primarily SBR, natural rubber, or polybutadiene, and from about 2 to about 8 parts by weight of a styrene-butadiene block copolymer. A block copolymer has at least two styrene blocks, each having a molecular weight of from about 5,000 to about 20,000 and may be linear or branched. The blend has good low and high temperature cohesive and adhesive properties, good low and high temperature flexibility, and good elasticity. The composition can be used as a crack sealer, a concrete joint sealer filler, an overlay sealant for construction materials, and the like.

20 Claims, No Drawings

METHOD OF MODIFYING ASPHALT WITH THERMOPLASTIC POLYMERS, GROUND RUBBER AND COMPOSITION PRODUCED

TECHNICAL FIELD

The present invention relates to a thermoplastic elastomer composition having an asphalt base and containing a styrene-butadiene block copolymer with at least two styrene blocks therein, as well as ground rubber. A source of the ground rubber can be recycled rubber, tires, etc., and the rubber can be either ground cryogenically, or at ambient temperatures.

BACKGROUND ART

Heretofore, various asphalt-based compounds have been made. However, none of them are of the type or composition as claimed by the present invention. For example, U.S. Pat. No. 4,069,182, while describing many rubber-modified asphalt compositions, does not describe the present compositions.

U.S. Pat. No. 4,068,023 relates to a rubberized asphalt paving composition made from asphalt, lubricating oil, and the like. U.S. Pat. No. 4,021,393 relates to a paving-grade asphalt which is mixed with a non-resistant rubber. However, both such disclosures lack any suggestion of applicant's styrene-butadiene block copolymers.

U.S. Pat. No. 3,440,195 relates to a sealant composition having a mixture of an asphalt with two block copolymers. However, very large amounts of the block copolymer are utilized.

U.S. Pat. No. 3,523,493 relates to block copolymers and reclaimed rubber.

U.S. Pat. No. 3,856,732 relates also to block copolymers in a modified asphalt hydraulic sealer, whereas U.S. Pat. No. 3,755,231 merely relates to a rubber composition containing styrene-butadiene block copolymers therein.

Similarly, U.S. Pat. No. 3,900,692 relates to modifying asphalt by the addition of styrene-butadiene block copolymers.

U.S. Pat. No. 4,264,481 relates to cryomilling of rubber.

U.S. Pat. No. 4,282,127 relates to a composition containing an asphalt, a polyolefin, and a butadiene-styrene copolymer.

U.S. Pat. No. 4,145,322 relates to a process for preparing a bitumen-block copolymer composition, whereas U.S. Pat. No. 4,250,067 relates to dissolving an asphalt in an extended oil in association with a rubbery copolymer. An asphalt-concrete composition is disclosed in U.S. Pat. Nos. 4,217,259 as well as 4,172,061. A bituminous composition containing a lithium salt is disclosed in U.S. Pat. No. 4,332,703.

Other patents include U.S. Pat. No. 3,345,316 relating to an asphalt-block copolymer composition; U.S. Pat. No. 3,978,014 relating to a bituminous composition, including a block copolymer as well as a thermoplastic polymer; and British Pat. No. 1,201,135 relating to a bituminous composition containing block copolymers therein.

An emulsion for bonding aggregates using block copolymers therein with petroleum oils is disclosed in U.S. Pat. No. 3,825,513. Kraton block copolymers are disclosed in U.S. Pat. Nos. 3,577,250 and 3,611,888 with regard to asphalt compounds.

British Pat. No. 2,038,848 relates to a styrene-butadiene block copolymer present in a bitumen composition.

U.S. Pat. Nos. 4,032,491 and 3,345,316 relate to roofing constructions including asphalt and block copolymers.

U.S. Pat. No. 4,145,322 also contains sulfur in a bitumen block copolymer composition, and U.S. Pat. No. 4,130,516 is somewhat similar.

U.S. Pat. No. 3,565,842 relates to a rubber asphalt emulsion system.

None of the above patents suggest applicant's composition of an asphalt, a small amount of a styrene-butadiene block copolymer, and ground rubber, nor do they relate to applicant's process of such compounds or to a process relating to a specific method of addition, heating and mixing.

DISCLOSURE OF INVENTION

It is thus an aspect of the present invention to provide a thermoplastic elastomer comprising an asphalt compound, ground rubber, a styrene-butadiene block copolymer having at least two styrene blocks therein, and an antioxidant.

It is a further aspect of the present invention to provide a thermoplastic elastomer composition, as above, wherein said composition contains a small amount of oil.

It is a further aspect of the present invention to provide a thermoplastic elastomer composition, as above, wherein said ground rubber is cryogenically ground.

It is yet a further aspect of the present invention to provide a thermoplastic elastomer composition, as above, according to a process wherein the asphalt is heated, the oil is then added and the composition heated to a higher temperature, and then the block copolymer and ground rubber is added and heated and mixed at yet a higher temperature.

It is a further aspect of the present invention to provide a thermoplastic elastomer composition, as above, wherein said composition has good low and high temperature cohesive and adhesive properties, good low temperature flexibility, good elasticity, and the like.

It is yet a further aspect of the present invention to provide a thermoplastic elastomer composition, as above, wherein said composition can be utilized as a sealant, a filler, and the like.

These and other aspects of the present invention will become apparent from the attached specification which describes in detail the present invention.

In general, a thermoplastic elastomer asphalt composition comprises: a blend of 100 parts by weight of an asphalt, said asphalt having a penetration value of from about 160 to about 195, and a softening point of from about 165 to about 175; from about 12 to about 20 parts by weight of a ground rubber per 100 parts by weight of said asphalt; and from about 2 to about 8 parts by weight of a styrene-butadiene block copolymer per 100 parts of said asphalt, said copolymer having at least two styrene blocks therein, said block copolymer having an end block molecular weight of from about 7,000 to about 10,000.

BEST MODE FOR CARRYING OUT THE INVENTION

A thermoplastic elastomer composition has an asphalt base, that is primarily consists of an asphalt compound, and also includes a styrene-butadiene block copolymer therein. The composition has good low as well as high temperature cohesion as well as adhesive properties and flexibility as well as increased elasticity. A primary area of use is as a crack sealer or road sealant.

The asphalt compound utilized in the present invention can be any conventional asphalt compound made up or having as a portion of the composition therein various asphaltenes, such as high molecular weight, polar, ambient temperature solid residues from n-heptane fractionation, various resins such as amorphous solids or soluble in benzene/ethanol, various aromatics such as low molecular weight oils and/or those soluble in n-pentane, and various saturates such as those soluble in benzene and/or low molecular weight paraffins and naphthenes. Generally, such asphalt compounds are characterized by their penetration value which is generally from about 160 to about 195 and preferably from about 165 to about 175, as well as often their softening point, as measured by the ring and ball method which may range from about 104° to about 114° F. and preferably from about 107° to about 111° F. Specific examples of suitable types of asphalt include AC-5 asphalt as well as AC-2.5 asphalt, manufactured by Shell, and related asphalts as manufactured by Shell.

The ground rubber amounts from about 12 to about 20 parts by weight based upon 100 parts by weight of said asphalt compound, with an amount of from about 14 to about 16 being preferred. The source of the ground rubber is typically tires, as for example from the tread area, the crown area, as well as the sidewall area. The type of rubber utilized for grinding is primarily styrene-butadiene rubber, natural rubber, synthetic polyisoprene, or polybutadiene. In fact, these three types of rubbers generally constitute at least 70 percent by weight of the total amount of rubber utilized in the ground rubber portion. The rubber can be ground by any convenient process as by hammering, grinding, etc., either at ambient temperatures or under cryogenic conditions. The particle size is generally important and is such that it usually passes through 20 mesh but is retained by 60 mesh, based upon the U.S. Standard screen series. Desirably, the size is from about 20 to 40 mesh. Although ambient temperature ground rubber can be utilized, it has been found that cryogenically ground rubber having a mesh size of less than 30 is desired in that it results in improved properties. Even though the ground rubber generally acts as a filler in the blend of the present invention, it is found to improve elasticity, has increased resistance to age-hardening, as well as improved temperature consistency by the use thereof.

The block copolymer utilized is generally in amounts of from about 2 to 8 parts by weight, and preferably from about 3 to 5 parts by weight, based upon 100 parts by weight of said asphalt. The nonstyrene portion of the block copolymer is solely butadiene in that other compounds do not give good results. The block copolymers of the present invention must contain at least two polystyrene blocks per molecule and can be arranged either in a linear or a branch (e.g., Star) setup. The block copolymer should contain from about 23 to about 40 percent by weight of styrene, and preferably from about 25 percent to about 35 percent. The molecular weight of the block copolymer should be from about 5,000 to about 20,000 and preferably from about 8,000 to about 17,000, based upon the weight average. Another important property of the block copolymer is that the solubility parameter should be in the range of from about 7.0 to about 9.0, with from about 7.6 to about 8.6 being preferred. The utilization of the block copolymers has been found to generally convert the asphalt to an elastomeric-like substance. Additionally, it improves the cohesive strength of the final blend. Examples of specific styrene-butadiene copolymers include the various thermoplastic Kraton compounds made by Shell such as Kraton D-1101, DX-1000 and D-1184. Other suitable compounds include the various Solprenes manufactured by Phillips Chemical Company.

Essential to the present blend is also small amounts of a heat-resistant, antioxidant to protect the block copolymers at elevated mixing or heating temperatures. By heat resistant, it is meant that the antioxidant generally inhibits any appreciable amount of oxidation up to 400° F. An amount of from about ½ part to about 2 parts by weight and preferably from about ½ to 1 part by weight is preferred. Typical examples of heat-resistant antioxidants include AO-36 manufactured by the Akron Chemical Company, and AO-47 (hindered polymerized styrenated phenols) manufactured by Western Reserve Chemical Co. Generally, any conventional antioxidant can be utilized.

Conventional tackifying agents are also desirable in the present invention in that they improve adhesion of the composition to substrates. For example, hydrogenated polyester resins can be utilized such as Foral 85 and/or Pentyln H, manufactured by Hercules Corporation. The amount of tackifying agent is generally small, as from about 0.02 to about 0.5 and desirably from about 0.03 to about 0.5 parts per 100 parts by weight of said asphalt compound.

Another ingredient often utilized is a processing oil, as in an amount of from about 6 to about 10 parts and preferably from about 7 to about 9 parts by weight per 100 parts of said asphalt. The oil has the effect of promoting the blending and plasticizing of the blend. A specific example of a suitable oil are the various Dutrex oils manufactured by the Shell Chemical Company such as Dutrex 419, or the various Sunthene oils e.g., Sunthene 410, a naphthenic oil, manufactured by the Sun Oil Company. Generally, any conventional rubber processing oils can be utilized such as the various aromatic oils.

The mixing procedure is generally as follows. The asphalt is heated to a temperature of from about 300° F. to about 400° F. and desirably from about 325° F. to about 375° F. The oil component is then added and the asphalt oil mixture heated to a temperature of from about 325° F. to about 350° F., with about 340° F. being preferred. At this time, the block copolymer, the ground rubber, the tackifier, if used, and the antioxidant are added. All of these components are then blended in a paddle type mixer and transferred to a high shear, low speed mixer of a constant speed and a variable temperature. It is important and critical to the present invention that the components be mixed under shear as opposed to folding or ordinary mixing in that otherwise phase separation occurs and the good physical properties are not obtained. The blend is heated to a temperature of about 325° F. about 400° F. for approximately 60 to about 150 minutes, and preferably about 120 minutes or until the mixture becomes essentially or somewhat homogeneous. Good agitation is needed so that the components are distributed throughout the entire mass. The oil in the blend functions to plasticize the rubber components and at room temperature helps to maintain a constant value for the penetration.

The thermoplastic elastomer asphalts of the present invention have been found to have good low and high temperature cohesion as well as adhesive properties. They also exhibit good low and high temperature flexibility and meets ASTM D 3405. Other improved properties include increased elasticity, higher ductility, higher resilience, good low temperature adhesion, good adhesion to substrates, and the like.

Several important uses for the composition of the present invention include use as crack sealants, waterproofing membranes, roofing membranes, sealants or adhesives, stress-absorbing membrane innerlayer (SAMI), stress-absorbing membranes, inner liners, concrete joint sealants and fillers, overlay sealants for construction materials, roofing and waterproofing membranes, undercoatings for domestic and military vehicles and equipment, pipe coatings, marine sealants, vibration and noise attenuation, and pothole fillers.

In addition to the above ingredients, various other common ingredients can be added such as colorants, inorganic fillers, and the like.

The invention will be better understood by reference to the following examples.

| RECIPE 1 | | |
|---|---|---|
| Asphalt (Shell AC-5) | 3.00 | pounds |
| Naphthenic Processing Oil | .42 | pounds |
| Shell Dutrex 954 Oil | .105 | pounds |
| Antioxidant (A.O. 36) | .0158 | pounds |
| Ground rubber | .776 | pounds |
| Block styrene-butadiene-styrene copolymer (Shell's Kraton 1101) | .1335 | pounds |
| Block styrene-butadiene-styrene copolymer (Shell's Kraton 1000) | .1335 | pounds |
| Tackifying agent (Foral) | .01 | pounds |
| TOTAL | 4.5940 | pounds |

| RECIPE 2 | | |
|---|---|---|
| Asphalt (Shell AC-5) | 3.00 | pounds |
| Naphthenic Processing Oil | 0.607 | pounds |
| Antioxidant (A.O. 36) | .0158 | pounds |
| Styrene-butadiene-styrene block copolymer (Shell's Kraton 1184) | .178 | pounds |
| Styrene-butadiene-styrene block copolymer (Shell's Kraton 1000) | .0889 | pounds |
| Ground rubber | .766 | pounds |
| Tackifying agent (Foral) | .02 | pounds |
| | .104 | pounds |
| TOTAL | 4.7807 | pounds |

The above formulations were prepared into an asphalt thermoplastic elastomer by initially heating the asphalt component to a temperature of 350° F. for approximately 60 minutes. The oil component was added and mixed at a temperature of 340° F. for 15 minutes. The block copolymer, the ground rubber, the antioxidant and the tackifier are then added and blended in a high shear mixer at a temperature of approximately 340°-360° F. for approximately 45 minutes. Recipe 1 was subjected to testing and yielded the following data, pouring temperature in °F., 375, penetration, cone at 77° F., was 60. The flow at 140° F., mm poured at 375° F. was 20, and a no break flex temperature of less than minus 25° F. Recipe 2 yielded similar data. The materials had good adhesive and cohesive temperature and excellent adhesion to substrates.

In contrast thereto, a flexible sealant thought to be a rubber modified asphalt cracked at a temperature of 10° F. Thus, it can be seen that applicant's invention has much better low temperature properties.

While applicant has described in detail the best mode and preferred embodiment of the present invention, according to the patent statutes, it is to be understood that the invention is not limited thereto or thereby, the invention being limited by the scope of the attached claims.

What is claimed is:

1. A thermoplastic elastomer asphalt composition, comprising:
a blend of
100 parts by weight of an asphalt, said asphalt having a penetration value of from about 160 to about 195, and a softening point of from about 104 to about 114;
from about 12 to about 20 parts by weight of a ground rubber per 100 parts by weight of said asphalt; said ground rubber having a particle size of from about 20 to about 60 U.S. Standard Mesh; said ground rubber selected from the class consisting of styrene-butadiene rubber, natural or synthetic polyisoprene, polybutadiene, or combinations thereof,
from about 2 to about 8 parts by weight of a styrene-butadiene block copolymer per 100 parts of said asphalt, said copolymer having at least two styrene blocks therein,
said block copolymer having from about 23 to about 40 percent by weight of styrene, a solubility parameter of from about 7.0 to about 9.0 and a weight average molecular weight of from about 5,000 to about 20,000, and from about 6 to about 10 parts by weight of a processing oil per 100 parts by weight of said asphalt.

2. A thermoplastic elastomer asphalt composition according to claim 1, wherein said blend includes from about ½ to about 2 parts by weight of a heat-resistant antioxidant per 100 parts of said asphalt.

3. A thermoplastic elastomer asphalt composition according to claim 2, wherein the amount of said styrene in said block copolymer is from about 23 to about 40 weight percent by weight.

4. A thermoplastic elastomer asphalt composition according to claim 3, wherein at least 70 percent of said rubber in said ground rubber component is natural or synthetic rubber, styrene-butadiene rubber, polybutadiene, or combinations thereof.

5. A thermoplastic elastomer asphalt composition according to claim 4, wherein the molecular weight of said block copolymer is from about 8,000 to about 17,000.

6. A thermoplastic elastomer asphalt composition according to claim 5, including from about 0.02 to about 0.05 parts by weight of tackifying agent per 100 parts by weight of said asphalt component.

7. A thermoplastic elastomer asphalt composition according to claim 6, wherein said asphalt has a penetration value of from about 165 to about 175, and a softening point of from about 107° to about 111° F.

8. A thermoplastic elastomer asphalt composition according to claim 7, wherein the amount of said ground rubber is from about 14 to about 16 parts by weight, wherein the amount of said block copolymer is from about 3 to about 5 parts by weight, wherein the amount of said tackifying agent is from about 0.03 to about 0.05 parts by weight, and wherein the amount of said antioxidant is from about ½ to about 1 part by weight.

9. A thermoplastic elastomer asphalt composition according to claim 8, wherein the particle size of said ground rubber is from about 20 to about 40 mesh and wherein the molecular weight of said block copolymer is from about 8,000 to about 17,000.

10. A thermoplastic elastomer composition according to claim 9, wherein said ground rubber has been cryogenically ground.

11. A process for forming a thermoplastic elastomer asphalt, comprising the steps of:

obtaining 100 parts by weight of an asphalt, said asphalt having a penetration value of from about 160 to about 195, and a softening point of from about 104° F. to about 114° F.;

obtaining from about 12 to about 20 parts by weight of a ground rubber; said ground rubber having a particle size of from about 20 to about 60 U.S. Standard Mesh; said ground rubber containing essentially of styrene-butadiene rubber, natural or synthetic polyisoprene, polybutadiene, or combinations thereof obtaining from 12 to about 20 parts by weight of a styrene-butadiene block copolymer having at least two styrene blocks therein, said block copolymer having from about 23 to about 40 percent by weight of styrene, a soluability parameter of from about 7.0 to about 9.0 and a weight average molecular weight of from about 5,000 to about 20,000;

obtaining from about 6 to about 10 parts by weight of a processing oil per 100 parts by weight of said asphalt, and heating said asphalt, said oil, said ground rubber and said block copolymer to a temperature of from about 325° to about 400° F. and mixing under high shear.

12. A process according to claim 11, including adding from about ½ to about 2 parts by weight of a heat-resistant antioxidant.

13. A process according to claim 12, wherein the amount of said styrene in said block copolymer is from about 23 to about 40 weight percent by weight;

wherein at least 70 percent of said rubber in said ground rubber is natural rubber, synthetic polyisoprene, styrene-butadiene rubber, polybutadiene, or combinations thereof; and wherein the molecular weight of said block copolymer is from about 8,000 to about 17,000.

14. A process according to claim 13, wherein the amount of said ground rubber is from about 14 to about 16 parts by weight, wherein the amount of said block copolymer is from about 3 to about 5 parts by weight, and wherein the amount of said antioxidant is from about ½ to about 1 part by weight.

15. A process according to claim 14, wherein the particle size of said ground rubber is from about 20 to about 40 mesh and wherein the molecular weight of said block copolymer is from about 8,000 to about 17,000.

16. A process according to claim 13 including separately heating said asphalt to a temperature of from about 300° F. to about 400° F., heating a mixture of said process oil and said asphalt to a temperature of from about 325° F. to about 350° F;

adding said antioxidant, said block copolymer, and said ground rubber and heating and mixing at a temperature of from about 325° F. to about 400° F.

17. A process according to claim 15, including separately heating said asphalt to a temperature of from about 300° F. to about 400° F. heating a mixture of said process oil and said asphalt to a temperature of from about 350° F, adding said antioxidant, said block copolymer, and said ground rubber and heating and mixing at a temperature of from about 325° F. to about 400° F.

18. A process according to claim 13, including adding from about 0.02 to about 0.05 parts by weight of a tackifying agent per 100 parts of said asphalt.

19. A process according to claim 16, including adding from about 0.02 to about 0.05 parts by weight of a tackifying agent per 100 parts of said asphalt, and including mixing said tackifying agent with said antioxidant.

20. A process according to claim 19, including adding from about 0.02 to about 0.05 parts by weight of a tackifying agent per 100 parts of said asphalt, and including mixing said tackifying agent with said antioxidant.

* * * * *